(12) United States Patent
Fujita

(10) Patent No.: US 6,985,957 B2
(45) Date of Patent: Jan. 10, 2006

(54) GATEWAY SYSTEM, GATEWAY SYSTEM CONFIGURING METHOD, AND GATEWAY APPARATUS

(75) Inventor: Ken Fujita, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/933,075

(22) Filed: Sep. 1, 2004

(65) Prior Publication Data

US 2005/0044161 A1    Feb. 24, 2005

Related U.S. Application Data

(63) Continuation of application No. 09/604,879, filed on Jun. 28, 2000, now abandoned.

(30) Foreign Application Priority Data

Jun. 29, 1999    (JP) ................................. 11-182972

(51) Int. Cl.
G06F 15/16    (2006.01)
G06F 15/173    (2006.01)
H04J 3/16    (2006.01)
H04L 12/66    (2006.01)

(52) U.S. Cl. ...................... 709/229; 709/202; 709/225; 370/230; 370/352; 370/465

(58) Field of Classification Search ................ 709/202, 709/208, 225–229; 370/230, 351, 352, 401, 370/465

See application file for complete search history.

(56) References Cited

U.S. PATENT DOCUMENTS

| 6,229,804 | B1 | 5/2001 | Mortsolf et al. |
| 6,360,265 | B1 | 3/2002 | Falck et al. |
| 6,374,302 | B1 | 4/2002 | Galasso et al. |
| 6,519,249 | B1 * | 2/2003 | Bennefeld et al. .......... 370/352 |
| 6,693,874 | B1 | 2/2004 | Shaffer et al. |
| 2001/0046209 | A1 | 11/2001 | Glassman |

OTHER PUBLICATIONS

Dawson, Fred. IP routers Bang at Integration Gate, Sep. 28, 1998, Inter@ctive Week, vol. 5, Issue 37, p26.

* cited by examiner

*Primary Examiner*—Saleh Najjar
*Assistant Examiner*—David Lazaro
(74) *Attorney, Agent, or Firm*—Foley & Lardner LLP

(57) ABSTRACT

To provide a gateway system capable of handling more gateways in one gatekeeper by dividing gatekeeper functions and mounting a part of the H.323 gatekeeper functions in a gateway apparatus. The gateway apparatus includes a proxy gatekeeper, and a gateway. A master gatekeeper and the gateway apparatus form an H.323 zone, and communicate with gatekeepers and endpoints in other zones via a network address & port number translator.

1 Claim, 7 Drawing Sheets

GATEWAY SYSTEM, GATEWAY SYSTEM CONFIGURING METHOD, AND GATEWAY APPARATUS

This application is a continuation of application Ser. No. 09/604,879, filed Jun. 28, 2000, now abandoned.

BACKGROUND OF THE INVENTION

1. Field of the Invention

The present invention relates to a gateway system, gateway system configuring method, and a gateway apparatus in an H.323 specification communication system, especially to the gateway system, it's configuring method, and a gateway apparatus which is capable of handling more gateways in one gatekeeper by dividing H.323 gatekeeper functions and mounting part of the gatekeeper functions, in each gateway apparatus.

2. Description of the Prior Art

Up to now, H.323 gateway systems have been used for relay between communication conforming to ITU-T recommendation H.323, which is a standard specification of a service quality non-guaranteed LAN and communication conforming to another standard different from the recommendation H.323 so as to perform protocol conversion. In an H.323 model, one zone is configured by one gatekeeper, and one or more endpoint(s) (gateway(s) or H323 terminal(s)). The gatekeeper performs address translation, access conversion control, bandwidth management, or the like, and controls the gateway(s). If a number of gateways in one zone increases, convergence of gatekeeper processing is avoided by providing a plurality of gatekeepers. Nevertheless, since a gateway can be registered in only one gatekeeper at the same time, gateways are separated into a plurality of zones constituted for every gatekeeper.

BRIEF SUMMARY OF THE INVENTION

Object of the Invention

There are several problems with the use of the conventional H.323 technology described above.

A first problem is that, if a plurality of zones is constituted in a state of a number of gateways being not changed, a call loss probability becomes large. This is because, the smaller the scale a zone becomes, the smaller a mass effect becomes. On the contrary, to maintain a reasonable call loss probability, a number of gateways must unfortunately increases.

A second problem is that, in the case of a one-zone configuration, a number of gateways that can be contained is limited by the capacity of a gatekeeper. In order to contain more gateways in one zone, it is necessary to use a higher-performance gatekeeper, or it is necessary to separate gateways into a plurality of zones and add an appropriate number of gatekeepers. This causes an increase in capital expense or operation expense.

The present invention is to provide a gateway system and gateway system configuring method for solving the above-described problems. The gateway system handles more gateways in one gatekeeper by dividing gatekeeper functions in an H.323 specification communication system, and mounts parts of the gatekeeper functions in a gateway apparatus.

SUMMARY OF THE INVENTION

In order to solve the above-described problems, a gateway system, it's configuring method and a gateway apparatus according to the present invention in an H.323 specification communication system is characterized in that the gateway system comprises a master gatekeeper having a gateway control function including an address translation function for communicating with other zones, a zone management function, and a call control signaling-function, a proxy gatekeeper having the address translation function and zone management function out of the gateway control function of this master gatekeeper, and a gateway performing protocol conversion for communicating with other zones.

Owing to the above configuration, the gateway system handles an address translation request in the proxy gatekeeper to reduce the load of the master gatekeeper.

BRIEF DESCRIPTION OF THE DRAWINGS

The above-mentioned and other objects, features and advantages of this invention will become more apparent by reference to the following detailed description of the invention taken in conjunction with the accompanying drawings, wherein.

DETAILED DESCRIPTION OF THE PREFERRED EMBODIMENTS

Next, embodiments of the present invention will be described with reference to drawings.

Figure 1:
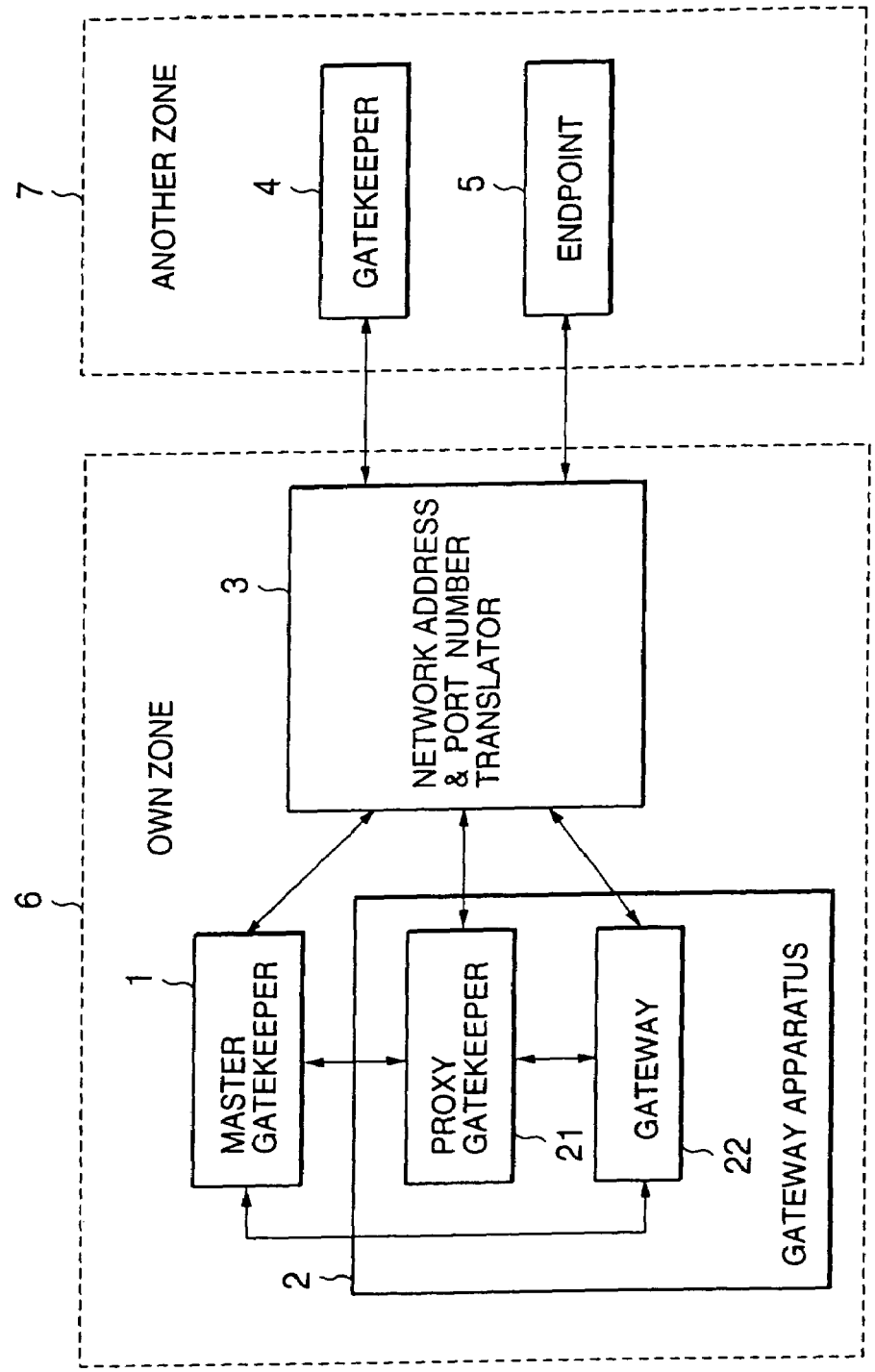
FIG. 1 is a block diagram of a gateway system according to the present invention.

FIG. 1 shows a configuration of the present invention, and this embodiment includes a master gatekeeper 1, a gateway apparatus 2, and a network address & port number translator 3. The gateway apparatus 2 comprises a proxy gatekeeper 21, and a gateway 22. The master gatekeeper 1 and gateway apparatus 2 form a zone 6 described in the H.323 specification, and the zone 6 communicates with a gatekeeper 4 and an endpoint 5 in another zone 7 via the network address & port number translator 3.

The gateway apparatus 2 comprises the gateway 22 and proxy gatekeeper 21. The proxy gatekeeper 21 has an address translation function and a zone management function that are similar to those of the master gatekeeper 1. The gateway 22 performs protocol conversion for the communication of the zone 6 with another zone 7.

Figure 2:
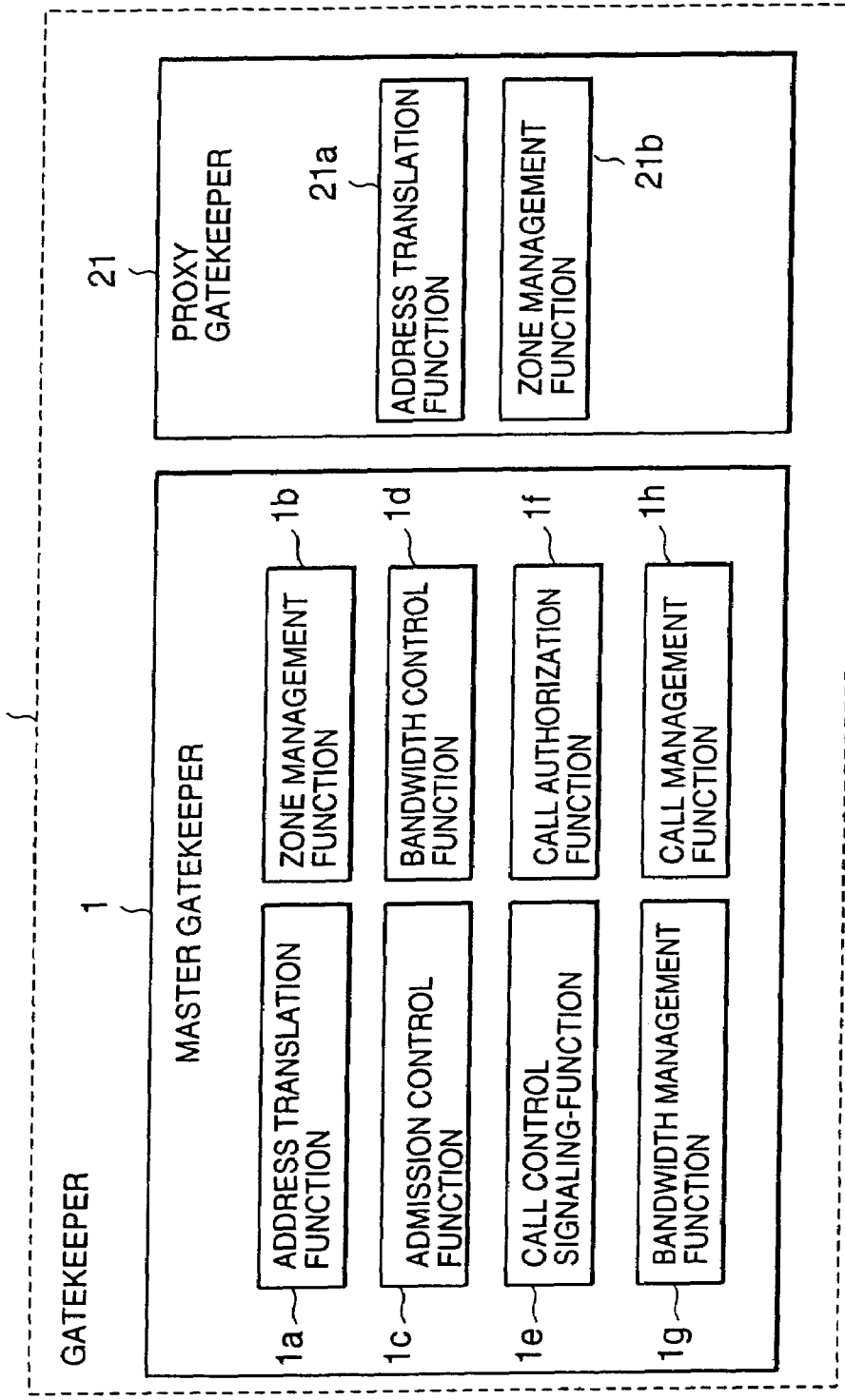
FIG. 2 is a functional block diagram of an H.323 gatekeeper.

As shown in FIG. 2, the functions of a conventional gatekeeper 8 is functionally dispersed in the master gatekeeper 1 and proxy gatekeeper 21. The proxy gatekeeper 21 has an address translation function 21a and a zone management function 21b out of the gateway control function that the conventional H.323 gatekeeper 8 has for processing, so as to resolve a bottleneck due to access convergence from gateways. The master gatekeeper 1 has an admission control function 1e, a bandwidth control function id, a call control signaling-function 1e, a call authorization function 1f, a band width management function 1g, and a call management function 1h besides an address translation function 1a and a zone management function 1b.

The network address & port number translator 3 has a function for mutually translating network addresses and port numbers when any one of the master gatekeeper 1, proxy gatekeeper 21, and gateway 22 communicates with another zone 7. A port number is an address in a transport layer. In particular, by translating a network address and a port number of the master gatekeeper 1 into a network address and a port number of the proxy gatekeeper 21, the proxy gatekeeper 21 seems from the gatekeeper 4 and endpoint 5 of another zone 7 to be a gatekeeper of the zone 6 instead of the master gatekeeper 1.

The gateway 22 has a function for again requesting an admissions request to a call, which was rejected by an admissions rejection from the proxy gatekeeper 21, of the master gatekeeper 1 in addition to the conventional H.323 gateway function.

Next, the operation of this embodiment will be described with reference to FIGS. 1, 3, and 4 in detail.

Figure 3:
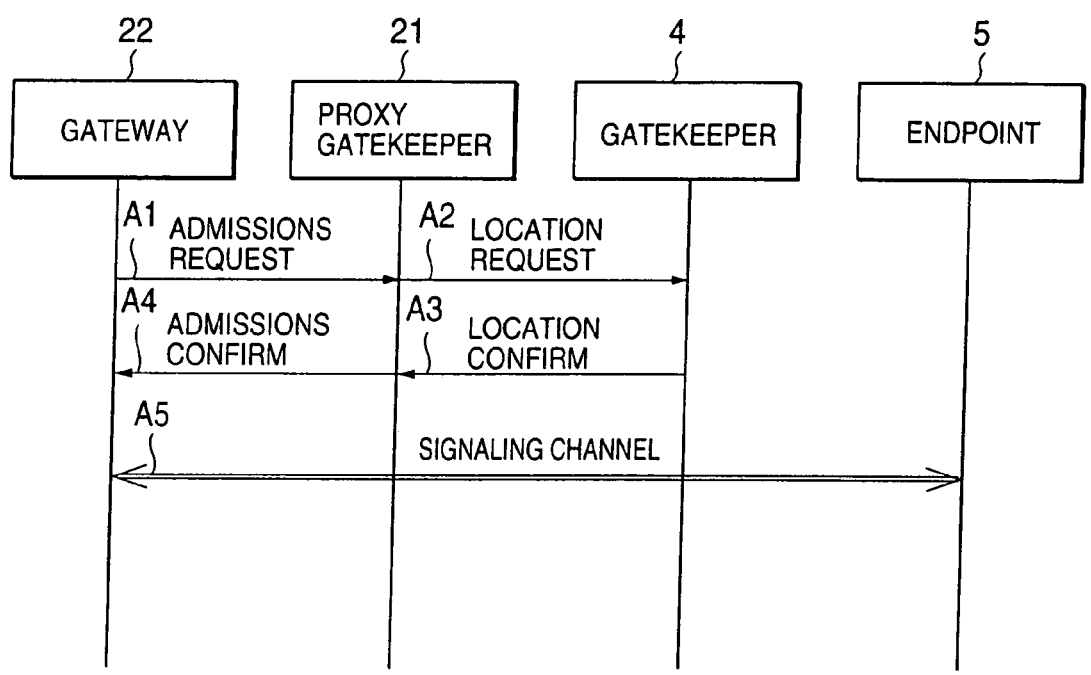
FIG. 3 is an explanatory diagram of transmission and reception between a gateway and an endpoint.

In FIG. 3, when transmitting a signal to the endpoint 5, the gateway 22 transmits an admissions request A1 to the proxy gatekeeper 21. The proxy gatekeeper 21 transmits location request A2 to the gatekeeper 4 of another zone 7 by the address translation function, and acquires a transport address for signaling the endpoint 5 from the response of location confirm A3. The proxy gatekeeper 21 transmits admission confirm A4 to the gateway 22 if acknowledging the admission request A1. The gateway 22 opens a signaling channel A5 to a transport address designated in the admission confirm A4.

Figure 4:
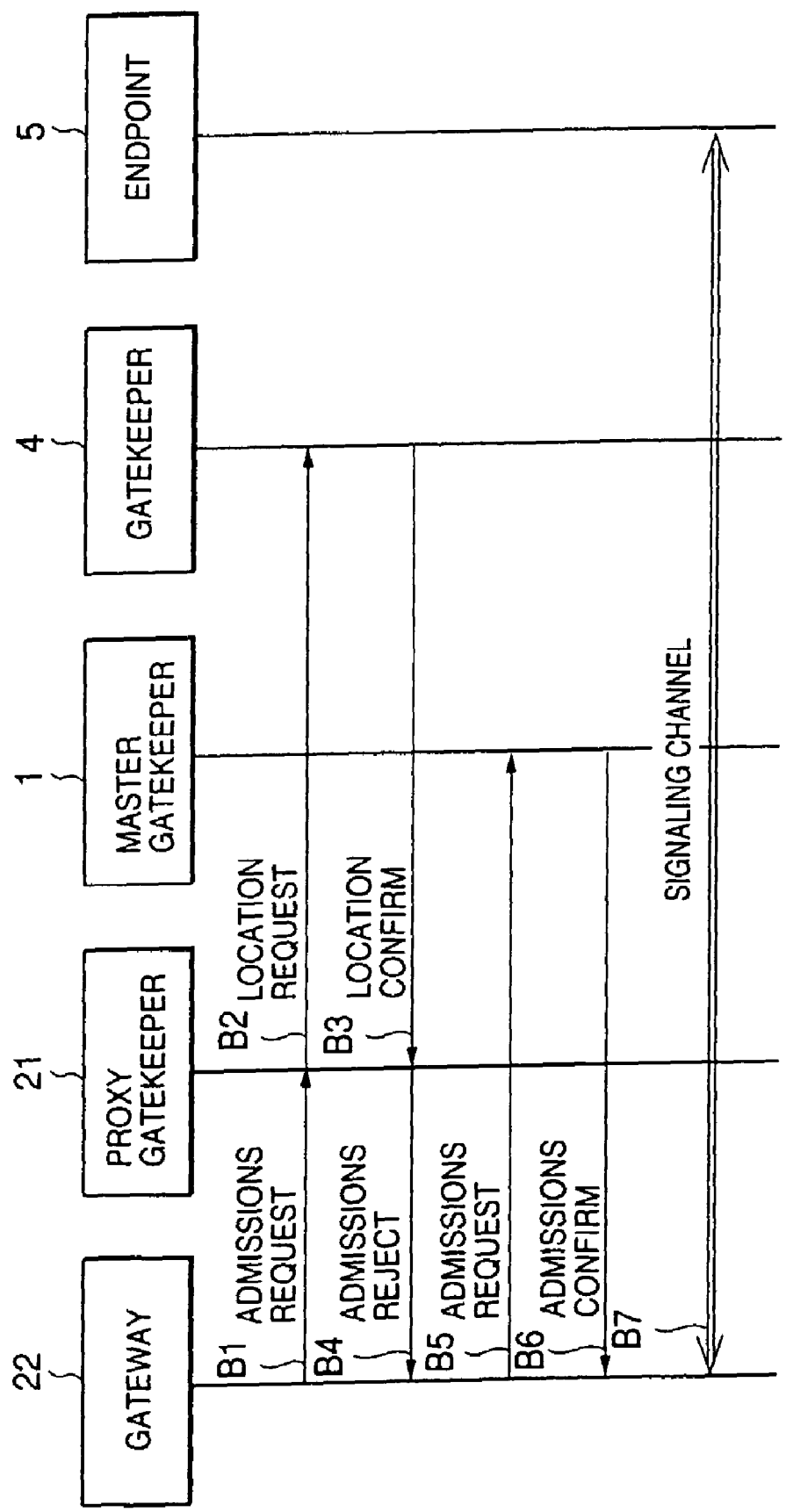
FIG. 4 is another explanatory diagram of transmission and reception between a gateway and an endpoint.

On the other hand, in FIG. 4, if the gateway 22 transmits an admissions request B1, requesting a function that the proxy gatekeeper 21 does not have, the proxy gatekeeper 21 transmits location request B2 to the gatekeeper 4 of another zone 7 by the address translation function. If the proxy gatekeeper 21 acquires a transport address for signaling the endpoint 5 from the response of location confirm B3, the proxy gatekeeper 21 transmits admission reject B4. The gateway 22 receiving the admission reject B4 transmits an admissions request B5 to the master gatekeeper 1. The master gatekeeper 1 transmits an admissions confirm B6 to the gateway 22 if acknowledging the admission request. The gateway 22 opens a signaling channel B7 to a transport address designated in the admission confirm B6.

Next, the operation of this embodiment will be described by using a concrete example. For example, in FIG. 3, if transmitting a signal to an alias address of the endpoint 5, "012-345-6789", the gateway 22 first transmits the admission request A1, sent to this alias address "012-345-6789", to the proxy gatekeeper 21. The proxy gatekeeper 21 transmits the location request A2 to the gatekeeper 4 containing this alias address of the endpoint 5, "012-345-6789", and acquires a transport address "10.1.2.3:1720" for the endpoint 5 from the response of the location confirm A3. After that, the proxy gatekeeper 21 transmits the admission confirm A4, including the transport address "10.1.2.3:1720" for the endpoint 5, to the gateway 22. The gateway 22 opens the signaling channel A5 to the transport address "10.1.2.3:1720" designated.

In addition, in FIG. 4, when transmitting the admission request B1, including user authentication, to the proxy gatekeeper 21, the proxy gatekeeper 21 transmits the admission reject B4 since it does not having a authentication function. The gateway 22 receiving the admission reject again transmits the admission request B5 to the master gatekeeper 1. The master gatekeeper 1 transmits the admission confirm B6 to the gateway 22 if the user authentication is successful and the master gatekeeper 1 acknowledges the admission request. The gateway 22 opens the signaling channel B7 to a transport address designated in the admission confirm B6.

Next, another embodiment of the present invention will be described.

Figure 5:
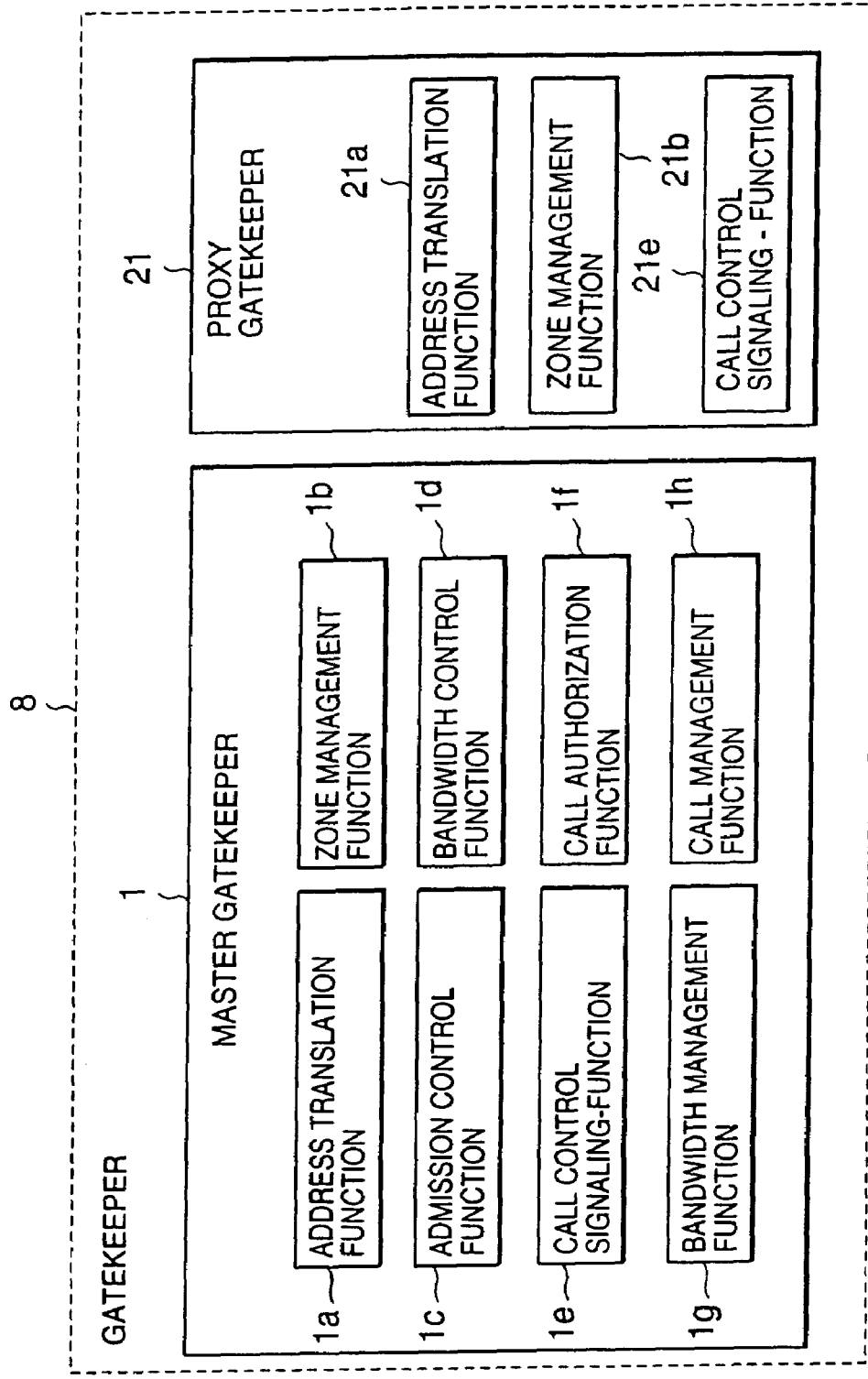
FIG. 5 is a functional block diagram of another H.323 gatekeeper.
Figure 6:
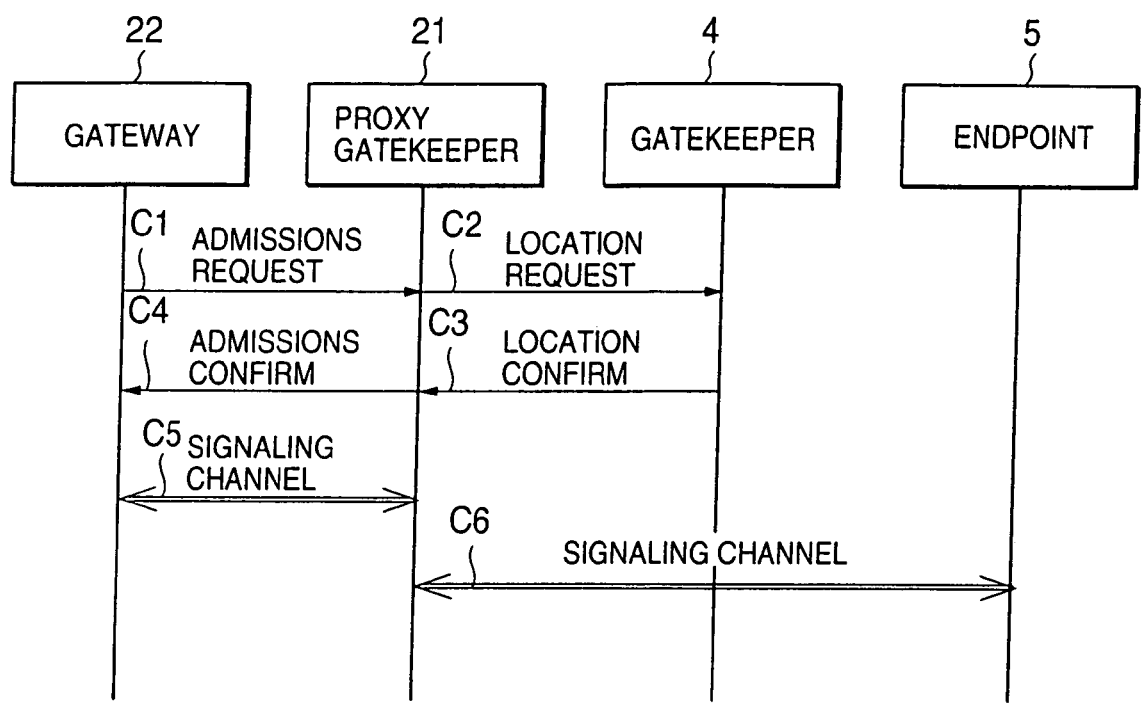
FIG. 6 is still another explanatory diagram of transmission and reception between a gateway and an endpoint.

In FIG. 5, this embodiment is different at the point of having a call control signaling-function 21e in addition to the address translation function 21a and zone management function 21b in the embodiment shown in FIG. 2. Owing to that, a signaling channel between the gateway 22 and endpoint 5 is not directly opened by the judgment of the proxy gatekeeper 21 as shown in FIG. 6. Nevertheless, a signaling channel C5 between the gateway 22 and proxy gatekeeper 21 and a signaling channel C6 between the proxy gatekeeper 21 and endpoint 5 are opened.

Figure 7:
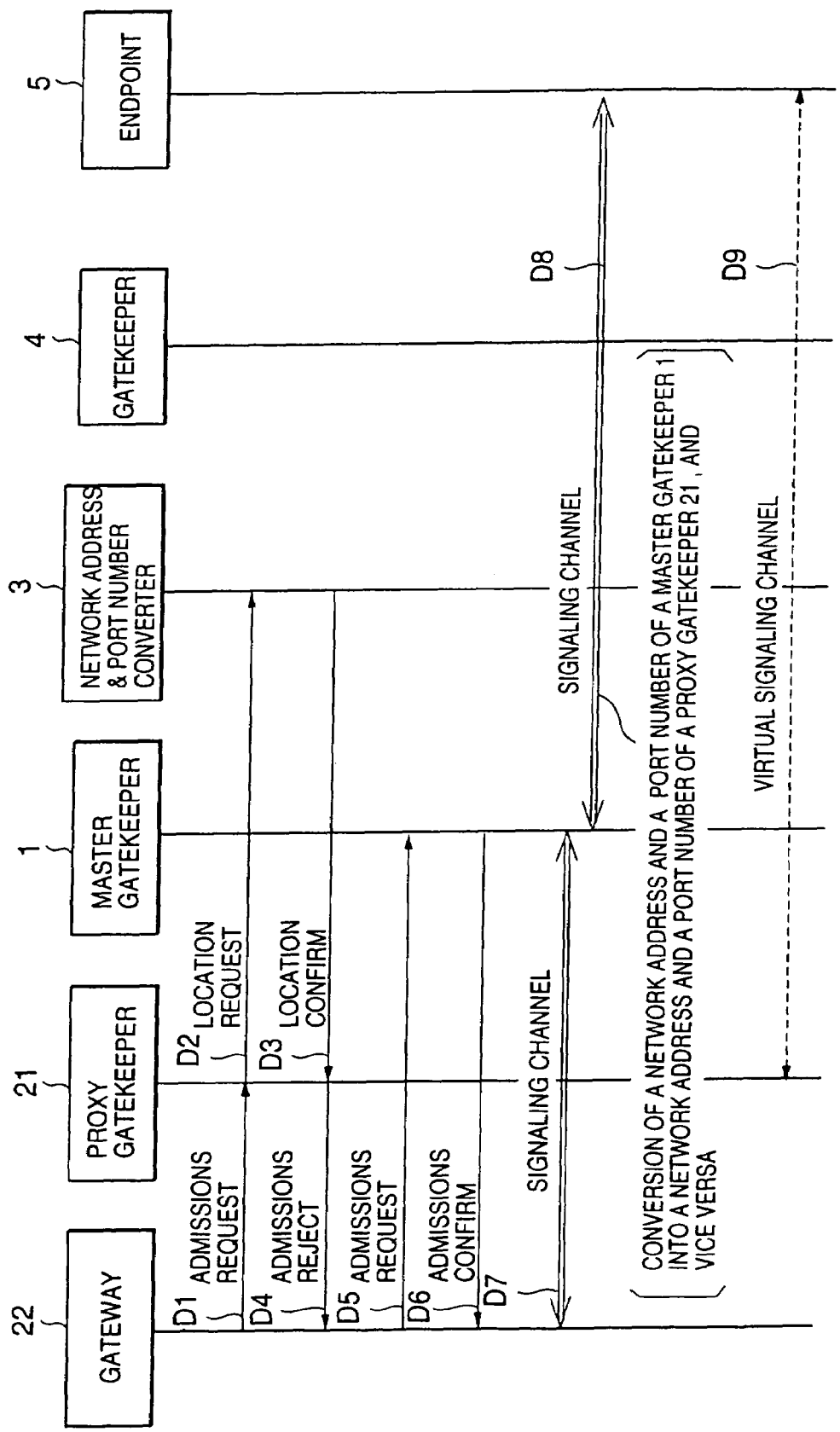
FIG. 7 is a further explanatory diagram of transmission and reception between a gateway and an endpoint.

In addition, with referring to FIG. 7, this embodiment is different at the point of giving the information of a transport address for signaling the master gatekeeper 1 instead of the transport address for signaling the endpoint 5 in the admission confirm D6 the information of which the master gatekeeper 1 gives to the gateway 22. Owing to this, the signaling channel between the gateway 22 and endpoint 5 is not directly opened. Nevertheless, a signaling channel D7 between the gateway 22 and master gatekeeper 1 and a signaling channel D8 between the master gatekeeper 1 and endpoint 5 are opened.

The network address & port number translator 3 mutually translates a network address and a port number of the master gatekeeper 1 and a network address and a port number of the proxy gatekeeper 21 every time a signal transmitted or received on the signaling channel D8 passes the network address & port number translator 3. In consequence, the signaling channel D8 seems from the endpoint 5 to be a signaling channel D9 opened between the endpoint 5 and proxy gatekeeper 21.

Next, a concrete example will be described. For example, in FIG. 6, if the gateway 22 transmits a signal to an alias address of the endpoint 5, "012-345-6789", the gateway 22 first transmits an admissions request C1, requesting the participation in this alias address "012-345-6789", to the proxy gatekeeper 21. The proxy gatekeeper 21 transmits location request C2 to the gatekeeper 4, containing this alias address of the endpoint 5, "012-345-6789", to acquire a transport address of the endpoint 5, "10.1.2.3:1720" from the response of location confirm C3. After that, the proxy gatekeeper 21 transmits admission confirm C4, including the transport address "10.4.5.6:1720" of the proxy gatekeeper itself instead of the transport address for the endpoint 5, to the gateway 22. The gateway 22 opens the signaling channel C5 to the transport address "10.4.5.6:1720" designated.

Furthermore, the proxy gatekeeper 21 opens the signaling channel C6 to the transport address "10.1.2.3:1720" for the endpoint 5. The signaling channels C5 and C6 forms a signaling channel between the gateway 22 and endpoint 5.

In addition, in FIG. 7, if the gateway 22 transmits a signal to the alias address of the endpoint 5, "012-345-6789", procedure from an admissions request D1 to an admissions request D5 is similar to the procedure from the admission request B1 to the admission request B5 in FIG. 4. The master gatekeeper 1 transmits an admission confirm D6, including the transport address of "10.4.5.6:1720" of the master gatekeeper 1 itself, instead of the transport address "10.1.2.3: 1720" for the endpoint 5, to the gateway 22 at the step of the admission. The gateway 22 opens the signaling channel D7 to the transport address "10.4.5.7:1720" designated. Furthermore, the master gatekeeper 1 opens a signaling channel D8 to the transport address of the endpoint 5, "10.1.2.3:1720". The signaling channels D7 and D8 forms a signaling channel between the gateway 22 and endpoint 5.

Here, the network address & port number translator 3 mutually translator a network address and a port number of the master gatekeeper 1, which are included in a signal sent from the master gatekeeper 1 to the endpoint 5, into a network address and a port number of the proxy gatekeeper 21 when the network address and port number of the master gatekeeper 1 pass the network address & port number translator 3. On the contrary, the network address & port number translator 3 mutually translator a network address and a port number of the proxy gatekeeper 21, which are included in a signal sent from the endpoint 5 to the master gatekeeper 1, into a network address and a port number of the master gatekeeper 1 when the network address and port number of the proxy gatekeeper 21 pass the network address & port number translator 3. Therefore, the signaling channel D8 seems from the endpoint 5 to be the signaling channel D9 opened between the endpoint 5 and proxy gatekeeper 21.

As described above, if transmitting a signal to the endpoint 5, the gateway 22 performs an admissions request, requesting the participation to the H.323 communication, to the proxy gatekeeper 21. The proxy gatekeeper 21 acquires an addressee's address of the endpoint 5 by the address translation function. Then, the proxy gatekeeper 21 gives the information, including the addressee's address in admissions confirm, to the gateway 22 if admission request is acceptable. If not, the proxy gatekeeper 21 informs the gateway 22 of admissions reject, including the addressee's address.

The gateway 22 again performs an admissions request, requesting the participation in the H.323 communication, to the master gatekeeper 1 if the participation is negatively acknowledged. The master gatekeeper 1 judges whether the admissions request of the gateway 22 is acceptable. The master gatekeeper 1 informs the gateway 22 of the admissions confirm or admissions reject. After receiving the admissions confirm from the proxy gatekeeper 21 or master gatekeeper 1, the gateway 22 opens a signaling channel between the gateway 22 and endpoint 5 to perform the subsequent H.323 procedure.

Owing to this, it becomes possible to handle more gateways than gateways that one conventional gatekeeper can handle.

As described above, the present invention handles an address translation request of a gateway with a proxy gatekeeper inside a gateway apparatus to reduce the load of a master gatekeeper. Therefore, it is possible to handle more gateways than gateways that one conventional gatekeeper can handle. In consequence, it becomes unnecessary to increase the processing capability of a gatekeeper or add a gatekeeper as a number of gateways is increased.

In addition, it is possible to reduce the processing wait time of a gateway, which is necessary only for address translation, by processing an address translation request of a gateway with a proxy gatekeeper inside a gateway apparatus.

What is claimed is:

1. A gateway apparatus in an H.323 specification communication system comprising:

a master gatekeeper in a first zone and having gateway control functions of an address translation function and a zone management function;

a proxy gatekeeper in said first zone and having an address translation function and a zone management function out of the gateway control functions of the master gatekeeper; said proxy gatekeeper further having a call control signaling-function; and a gateway in said first zone and performing protocol conversion for communicating with other zones;

said gateway having a transmitting part to transmit a first admissions request to the proxy gatekeeper;

said proxy gatekeeper receiving said first admission request and having a transmission part for transmitting a location request to a gatekeeper in a second zone;

said proxy gatekeeper having a receiving part for receiving a local confirm signal from said gatekeeper in said second zone;

said proxy gatekeeper transmitting part transmitting an admission rejection signal to said gateway;

said gateway receiving said admission rejection and said transmitting part transmitting a second admission request to said master gatekeeper; and said master gatekeeper having a receiving part for receiving said second admission request; and said master gatekeeper having a transmitting part for transmitting an admissions confirm signal to said gateway;

said gateway, upon receiving said admission confirm signal from said master gatekeeper, opening a signaling channel to an endpoint in said second zone.

* * * * *